United States Patent
Zimmer

(10) Patent No.: US 10,422,618 B2
(45) Date of Patent: Sep. 24, 2019

(54) SIZING TOOL FOR BELT

(71) Applicant: ZPE LICENSING INC., Temecula, CA (US)

(72) Inventor: Andrew Jason Zimmer, Temecula, CA (US)

(73) Assignee: ZPE LICENSING INC., Temecula, CA (US)

( * ) Notice: Subject to any disclaimer, the term of this patent is extended or adjusted under 35 U.S.C. 154(b) by 206 days.

(21) Appl. No.: 15/682,317

(22) Filed: Aug. 21, 2017

(65) Prior Publication Data
US 2019/0056209 A1    Feb. 21, 2019

(51) Int. Cl.
*G01B 3/10*   (2006.01)
*G01B 5/02*   (2006.01)
*G01B 3/14*   (2006.01)

(52) U.S. Cl.
CPC ......... *G01B 3/1084* (2013.01); *G01B 3/1082* (2013.01); *G01B 3/14* (2013.01); *G01B 5/02* (2013.01)

(58) Field of Classification Search
CPC ............................ G01B 3/1082; G01B 3/1084
USPC .............................. 33/555.1, 555.4, 701, 759
See application file for complete search history.

(56) References Cited

U.S. PATENT DOCUMENTS

| | | | | |
|---|---|---|---|---|
| 2,673,694 A * | 3/1954 | Howell | ................ | G01B 3/1005 185/37 |
| 3,407,507 A * | 10/1968 | Brubaker | ................ | G01B 5/025 33/555.4 |
| 3,918,166 A * | 11/1975 | Mason | ................ | G01B 3/1084 33/512 |
| 2012/0085277 A1* | 4/2012 | Abdel-Rahman | ........ | A41H 1/02 116/201 |
| 2012/0330607 A1* | 12/2012 | Mathis | ................ | G01B 3/1061 702/157 |
| 2014/0373367 A1* | 12/2014 | Pinal | ........................ | B43L 7/005 33/1 N |
| 2015/0369579 A1* | 12/2015 | Mathis | ................ | G01B 3/1082 33/701 |
| 2018/0242885 A1* | 8/2018 | Naqvi | ................ | A61B 5/1072 |

OTHER PUBLICATIONS

Texrope Tools, Texrope (website), Retrieved from the internet at least as early as Nov. 6, 2017, <URL: https://www.texrope.com/en/products/texrope-tools>.

(Continued)

*Primary Examiner* — George B Bennett
(74) *Attorney, Agent, or Firm* — Klein, O'Neill & Singh, LLP

(57) ABSTRACT

A tool for identifying a correct belt for a system of pulleys from a plurality of prefabricated belts having different lengths is disclosed. The tool may include a belt track attached to a first end portion of a measurement belt. The measurement belt may be wrapped around the system of pulleys. An opposed second end portion of the measurement belt may be disposed adjacent to the belt track which may include a reference indicator. The reference indicator will be aligned to one of a plurality of measurement markings on the second end portion which indicates the correct belt to order from among the plurality of prefabricated belts.

19 Claims, 12 Drawing Sheets

(56) References Cited

OTHER PUBLICATIONS

1 ADM Performance 8 Rib LS3 to LSA Supercharger 3 belt system kit for 2013-2015 Camaro SS, LSA Conversion (website), Retrieved from the internet at least as early as Nov. 6, 2017, <URL: https://lsa-conversion-store.myshopify.com/products/adm-8-rib-upgrade-kit-for-adm-lsa-supercharger-kit>.
Micro-V® Belt Length Finder, Gates (website), Retrieved from the internet at least as early as Nov. 6, 2017, <URL:http://www.gates.com/products/automotive/tools-and-sales-aids/professional-tools/micro-v-at-belt-length-finder>.
Ultimaterc.com, Bing (website), Retrieved from the internet at least as early as Nov. 6, 2017, <URL:https://www.bing.com/images/search?view=detailV2&ccid=COae3NpM&id=9DDE534FC3BA2EA11E31BA49C7F4F7A74D700B55&thid=OIP.COae3NpMPm_BPREwxfQVtwEsDh&q=strings+serpentine+measure&simid=608026281304000241&selectedIndex=>.

* cited by examiner

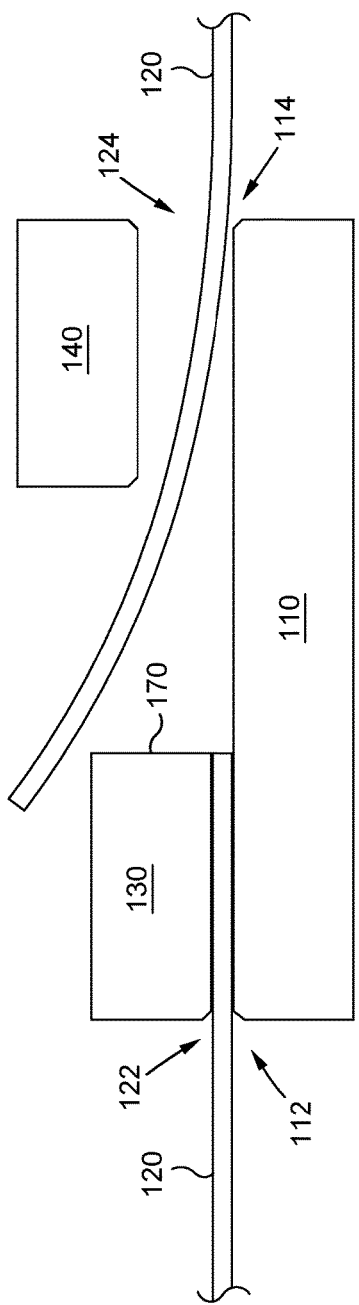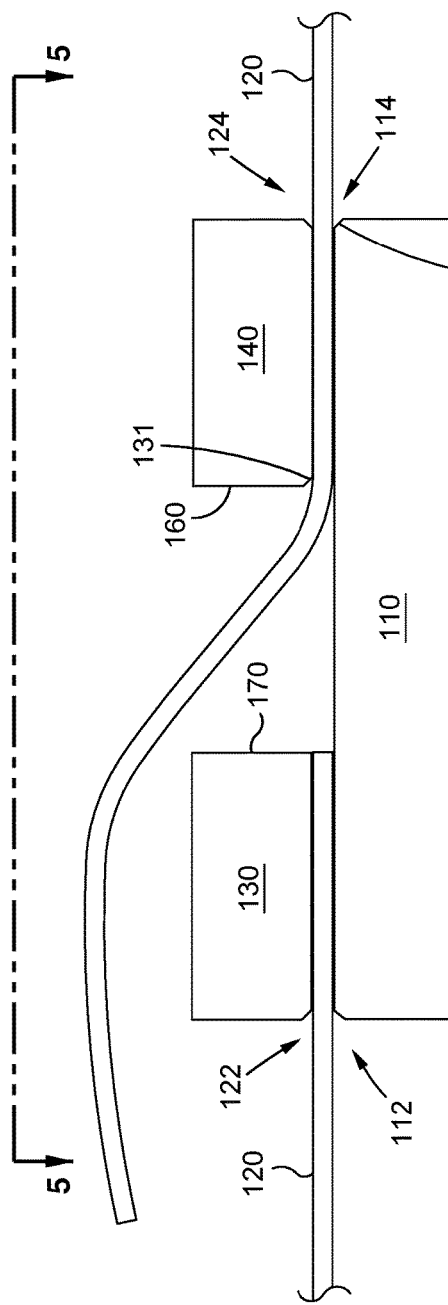

SIZING TOOL FOR BELT

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various embodiments and aspects discussed herein relate to a sizing tool for determining a correct belt (e.g., V-belt, flat belt, timing belt, or round belt) which transmits power between two rotating shafts from among a plurality of prefabricated belts having different lengths.

In an automobile engine, construction equipment, or industrial machinery, pulleys mounted on shafts are commonly used to transfer rotational motion, power, etc. between the shafts via one or more belts. For example, in a simple belt and pulley system, a driving pulley may be connected to a driven pulley by a V-belt or other belt, such that the rotation of the driving pulley causes the driven pulley to rotate. After a period of time, belts used in pulley systems need to be replaced due to wear. For customized pulley arrangements in custom cars, equipment and machinery, the length of the belt can be approximated but it would be difficult to correctly select the one belt from a plurality of belts having different lengths.

It is preferable that the belt length be appropriately sized for the particular customized pulley arrangement. A person replacing a belt can only approximate the needed belt length and so will purchase multiple belts of varying lengths and try each of them, discarding or returning the unused ones. This is not ideal because it wastes time, money and resources.

BRIEF SUMMARY

The present disclosure contemplates various devices and methods for overcoming the above drawbacks accompanying the related art. A person wants to choose an appropriate belt for a system of pulleys from a plurality of prefabricated belts rather than ordering multiple belts of approximately the same size to try them on and determine if one of them is the right size by trial and error. Using the tool described herein, the person can wrap a non-continuous measurement belt around the system of pulleys along the same belt path that the belt will follow. With the measurement belt disposed around the system of pulleys, the measurement belt may be overlapped and a measurement marking on the measurement belt may be read in order to determine the correct belt to order from a plurality of prefabricated belts having different lengths.

By way of example and not limitation, a first end portion of the measurement belt may be secured to a belt track. The opposite end of the measurement belt referred to as a second end portion of the measurement belt may have a plurality of measurement markings with each of the measurement markings corresponding to one of the plurality of prefabricated belt. With the measurement belt wrapped around the system of pulleys, the second end portion of the measurement belt may be placed adjacent to the belt track. The belt track, the first end portion of the belt or some other part of the tool may have a reference indicator that is fixed with respect to the belt track or the first end portion of the measurement belt. When the second end portion of the measurement belt is overlapped and placed adjacent to the belt track, the reference indicator will be aligned to one of the measurement markings. The measurement marking that is aligned to the indicator indicates the correct prefabricated belt from the plurality of prefabricated belts that the user should order for that particular system of pulleys.

More particularly, a tool for identifying a correct belt for a system of pulleys from among a plurality of prefabricated belts having different lengths is disclosed. The tool may comprise a belt track; a measurement belt may be configured to engage with the system of pulleys and may have a first end portion attached to the belt track and a second end portion, the measurement belt may have a plurality of measurement markings at premeasured positions along its length at the second end portion, the plurality of measurement markings may correspond to the plurality of prefabricated belts; a second end portion clamp may be adapted to attach the second end portion of the measurement belt to the belt track with the measurement belt disposed around the system of pulleys to test whether a tensioner of the system of pulleys is capable of placing sufficient tension on the measurement belt, wherein a measurement marking of the plurality of measurement markings that is aligned to a reference indicator on the tool identifies the correct belt to order for the system of pulleys from the plurality of prefabricated belts.

The first end portion of the measurement belt may be removable from the belt track; and the tool may further comprise a first end portion clamp adapted to attach the first end portion of the measurement belt to the belt track.

The belt track may have a mark signifying at a designated position for positioning the first end portion of the measurement belt on the belt track.

The first end portion clamp may be formed as a plate and may be disposed substantially parallel with a clamping surface of the belt track that presses the first end portion of the measurement belt against the belt track, the second end portion clamp may be formed as a plate and may be disposed substantially parallel with the clamping surface of the belt track that presses the second end portion of the measurement belt against the belt track, and the first and second clamps may be separated on the clamping surface by a space through which the measurement belt is pulled to adjust the measurement belt.

An interior edge of the second end portion clamp that borders the space and contacts the measurement belt may include a chamfer, bevel, or roller to reduce a coefficient of friction and facilitate traversal of the measurement belt between the second end portion clamp and the belt track.

The second end portion clamp may be formed as a plate and may be disposed substantially parallel with a surface of the belt track that presses the second end portion of the measurement belt against the belt track.

The second end portion clamp may be transitionable between a locked position in which the second end portion clamp presses the second end portion of the measurement belt against the belt track to attach the second end portion of the measurement belt to the belt track and an unlocked position in which the second end portion clamp moves away from the belt track to allow the second end portion of the measurement belt to slide between the second end portion clamp and the belt track.

The first end portion of the measurement belt and the second clamp may be separated on the clamping surface by a space through which the measurement belt is pulled to tension the measurement belt, and an interior edge of the second end portion clamp that borders the space may include a chamfer, bevel, or roller.

The second end portion clamp and/or a clamping surface of the belt track may include a one-way directional roller, gate, or friction coating that allows a length of the measurement belt from the first end portion clamp to the second end portion clamp to be reduced but not increased when the second end portion clamp is in a locked position.

The measurement belt may include grooves or protrusions, and the belt track may include grooves or protrusions corresponding to the grooves or protrusions of the measurement belt.

An exterior edge of the belt track that contacts the second end portion of the measurement belt as the second end portion clamp attaches the second end portion of the measurement belt to the belt track may include a chamfer, bevel, or roller.

The reference indicator may be a reference mark on the belt track, on the second end portion clamp, or on the first end portion of the measurement belt. The reference indicator may additionally or alternatively be an edge of the belt track, an edge of the second end portion clamp, or an extreme end of the first end portion of the measurement belt.

The first end portion of the measurement belt may be permanently attached to the belt track.

In another aspect, a tool for identifying a correct belt for a system of pulleys from among a plurality of prefabricated belt having different lengths is disclosed. The tool may comprise a measurement belt having a v-shaped or trapezoidal cross section for engaging with the system of pulleys and having a first end portion and a second end portion, the measurement belt may have a plurality of measurement markings at premeasured positions along its length at the second end portion, the plurality of measurement markings may correspond to the plurality of prefabricated belts, wherein a measurement marking of the plurality of measurement markings that is aligned to a reference indicator on the tool identifies the correct belt for the system of pulleys from the plurality of prefabricated belts.

In another aspect, a method for identifying a correct belt for a system of pulleys from among a plurality of prefabricated belts having different lengths is disclosed. The method may comprise disposing a measurement belt around the system of pulleys with a first end portion of the measurement belt attached to a belt track, the measurement belt may have a plurality of measurement markings at premeasured positions along its length at a second end portion of the measurement belt, the plurality of measurement markings may correspond to the plurality of prefabricated belts; and disposing the second end portion of the measurement belt adjacent to the belt track, wherein the correct belt for the system of pulleys from the plurality of prefabricated belts is identified by a measurement marking of the plurality of measurement markings that is aligned to a reference indicator on the belt track, on the second end portion clamp, or on the first end portion of the measurement belt.

The method may further comprise attaching the second end portion of the measurement belt to the belt track with a second end portion clamp.

The method may further comprise tensioning the measurement belt with a tensioner of the system of pulleys while the second end portion of the measurement belt is attached to the belt track with the second end portion clamp.

The method may further comprise disengaging the second end portion clamp from the belt track; shortening a length of the measurement belt while the second end portion clamp is disengaged from the belt track; and engaging the second end portion clamp to reattach the second end portion of the measurement belt to the belt track; tensioning the measurement belt with a tensioner of the system of pulleys while the second end portion of the measurement belt is attached to the belt track with the second end portion clamp.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4C is a schematic representation of a third part of a belt selection procedure;

FIG. 4D is a schematic representation of a fourth part of a belt selection procedure;

DETAILED DESCRIPTION

Figure 1:
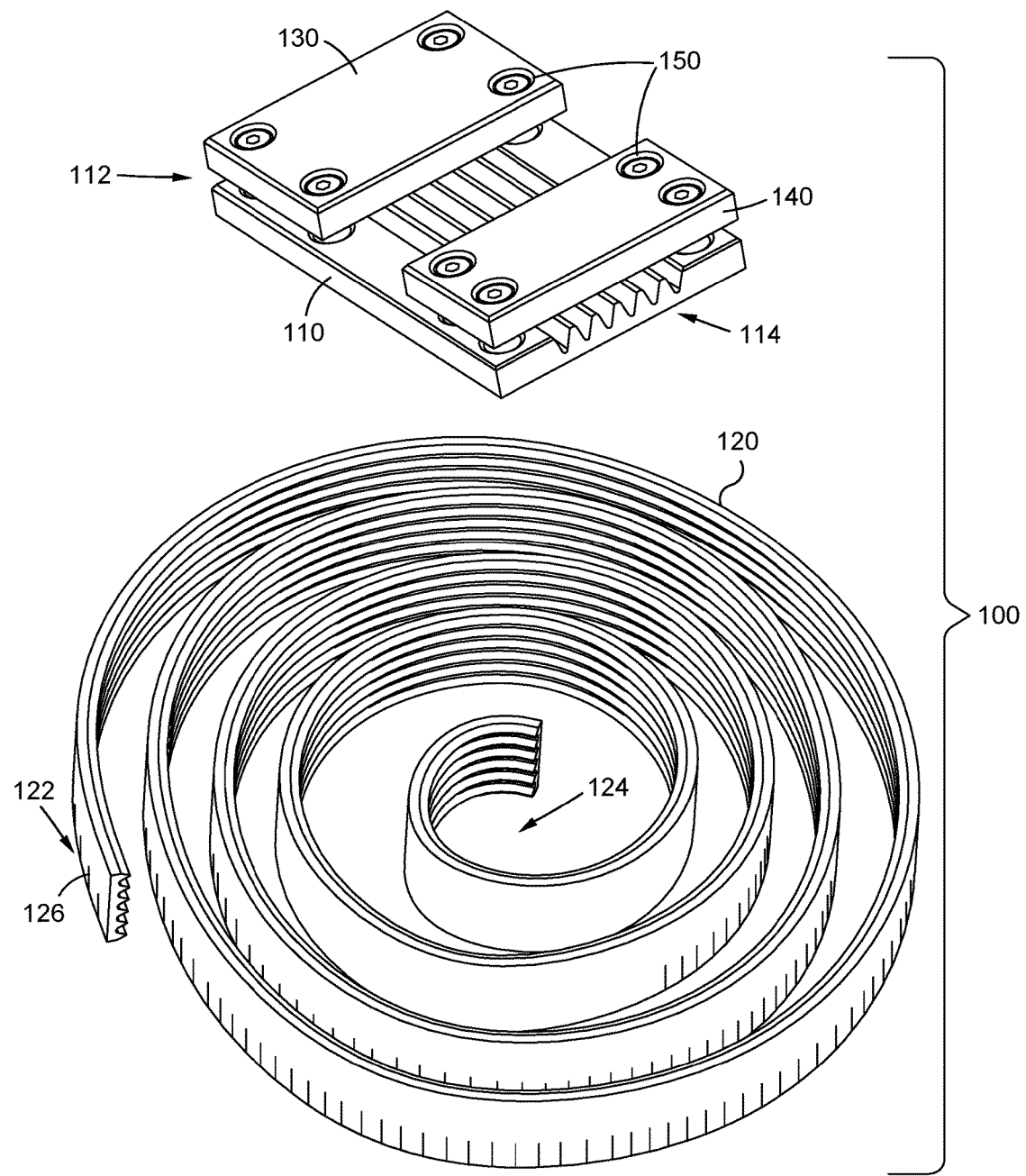
FIG. 1 is a perspective view of a tool for identifying a correct belt for a system of pulleys from a plurality of prefabricated belts having different lengths.

FIG. 1 is a perspective view of a tool 100 for identifying a correct belt of a belt to be ordered for a system of pulleys from among a plurality of prefabricated belts having different lengths. The tool 100 may include a belt track 110 having a first belt receiving end portion 112 and a second belt receiving end portion 114 and a measurement belt 120 having a first end portion 122 and a second end portion 124.

The tool 100 may further include a first end portion clamp 130 and a second end portion clamp 140. During use of the tool 100, the first end portion 122 of the measurement belt 120 may be clamped or attached to the belt track 110 using the first end portion clamp 130. The measurement belt 120 may be wrapped around the system of pulleys. The second end portion 124 of the measurement belt 120 may be clamped or attached to the belt track 110 using the second end portion clamp 140. To do so, the second end portion 124 of the belt 120 may be fed through a gap between the second belt receiving end portion 114 of the belt track 110 and the second end portion clamp 140. Measurement markings 160 on the measurement belt 120 may correspond to the plurality of predetermined belts. The tool 100 may have a reference indicator which aligns to one of the measurement markings. The measurement marking that is aligned to the reference indicator is read to determine the correct belt from a plurality of prefabricated belts. In this manner, the purchaser can purchase the right belt and does not need to order a number of different size belts around the approximate size to determine the correct size of the belt by trial and error.

The belt track 110 and/or clamps 130, 140 may be made of a durable material (e.g. metal, plastic, wood, etc.) sufficient to withstand the strain associated with the ordinary use of the tool 100 as described in more detail below. The belt track 110 and/or clamps 130, 140 may be produced by any combination of known manufacturing processes appropriate for the material, including forging, machining, and/or injection molding.

As shown in FIG. 1, the first end portion clamp 130 may be formed as a plate and be disposed substantially parallel with the upper surface of the belt track 110. The first end portion clamp 130 may press the first end portion 122 of the measurement belt 120 against the belt track 110 and holding or fixing the measurement belt 120 to the belt track 110. The first end portion clamp 130 may be removably engageable with the belt track 110 by means of screws or bolts 150 as shown or by any other fastener such as a clip or latch (e.g. a draw latch such as an over center latch). Similarly, the second end portion clamp 130 may be formed as a plate and be disposed substantially parallel with the upper surface of the belt track 110. The second end portion clamp 140 may press the second end portion 124 of the measurement belt 120 against the belt track 110 and hold or affix the measurement belt 120 to the belt track 110. The second clamp 140 may be removably engageable with the belt track 110 by means of screws or bolts 150 as shown or by any other fastener. The removed/disengaged state of the first end portion clamp 130 or the second end portion clamp 140 from the belt track 110 may be a completely detached state in which the clamp 130, 140 is separated from the belt track 110. Alternatively, the removed/disengaged state may be a state in which the clamps 130, 140 are not completely detached from the belt track 110 but is, for example, raised or moved away with respect to the belt track 110 which allows movement of the measurement belt 120 between the belt track 110 and the respective clamps 130, 140. For example, the engaged state may be a state in which the clamp 130, 140 and the belt track 110 clamps on the belt sufficiently hard to prevent slipping of the measurement belt 120 with respect to the belt track. In lieu of or in combination with bolts for removing the clamps 130, 140, it is contemplated that a push-button, release lever, or other mechanism may be provided to transition the clamps 130, 140 to an unlocked state in which the clamp 130, 140 is allowed to move away from the belt track 110 so that the measurement belt 120 can slide in a gap between the clamp 130, 140 and the belt track 110. It is also contemplated that the push-button, release lever or other mechanism may be provided to transition the clamps 130, 140 to a locked state in which the clamp 130, 140 is allowed to move closer to the belt track 110 to attach the measurement belt 120 to the belt track 110. In the locked state, the gap between the clamp 130, 140 and the belt track 110 is fixed. The push-button, release lever, or other mechanism may function to bias the clamps 130, 140 toward the locked state, requiring a user operation to transition the clamps 130, 140 to the unlocked state. It is contemplated that there may be one push-button, release lever or other mechanism per clamp 130, 140 in order to transition the clamp 130, 140 to the locked or unlocked states.

The measurement belt 120 may be made of any known belt material, including rubber (e.g. ethylene propylene diene monomer rubber), synthetic polymers, fabric, leather, etc., with or without embedded fibers. Preferably, the measurement belt 120 does not stretch. The measurement belt 120 may have various grooves or protrusions, such as the longitudinal grooves separating the two or more sub-belts of a banded belt, the longitudinal ribs of a ribbed belt, the lateral ridges of a timing belt, or other features characteristic of belts. The measurement belt 120 may have a v-shaped or trapezoidal cross section characteristic of a V-belt. The measurement belt 120 may be designed to be "universal" and fit a variety of sheaves and pulley systems for a variety of belt types including V-belts, flat belts, timing belts, and round belts having various belt features. Alternatively, or additionally, the tool 100 may include a plurality of measurement belts 120 to be used with different types of pulley systems, and the belt track 110 may be designed to be "universal" and fit all of the measurement belts 120. As shown in FIG. 1, the upper surface of the belt track 110 includes multiple grooves or protrusions corresponding to the grooves or protrusions of the measurement belt 120. Thus, the belt track 110 may be designed to fit one or more banded or ribbed measurement belts 120 (e.g. different measurement belts with different numbers of bands or ribs).

The measurement belt 120 may further include measurement markings 126 at premeasured positions along its length at the second end portion 124. The measurement markings 126 may correspond to typical belt lengths in the industry or brand of belts (e.g. Gates) or may simply be length markings in metric or imperial units, or may correspond to a combination of typical belt lengths and metric/imperial length markings. The measurement markings 126 may run for the entire extent of the measurement belt 120 or may be omitted from regions unlikely to be used, e.g. an initial length at the first end portion 122 corresponding to the length of the belt track 110 (as the measurement belt 120 must loop from one side of the belt track 110, around a pulley system, and back to the other side of the belt track 110 before the measurement markings 160 will typically be used). The measurement markings 160 may be made by paint or dye or may be notches or holes in the measurement belt 120.

Figure 2:
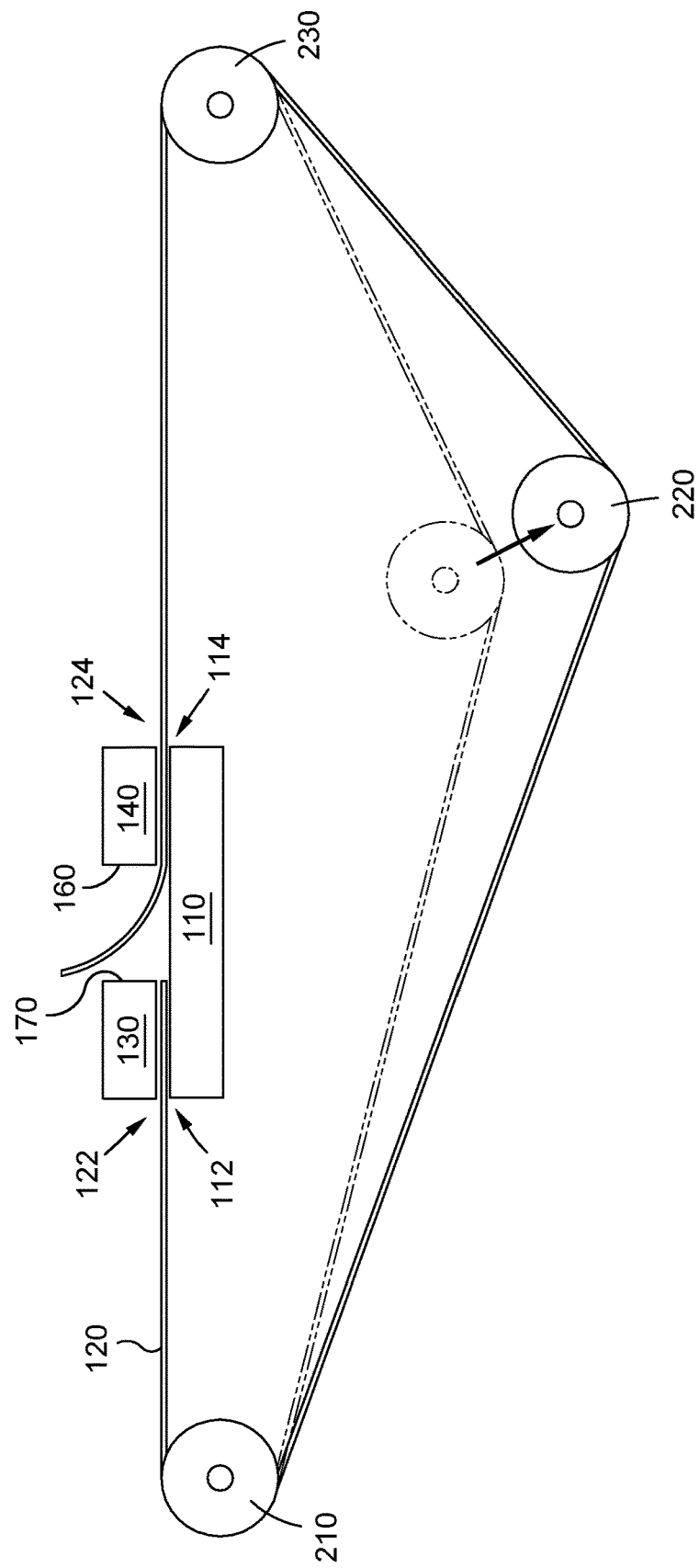
FIG. 2 is a schematic representation of a belt track, a measurement belt, a first end portion clamp, and a second end portion clamp of the tool as the tool is being used to identify a correct belt for a system of pulleys from a plurality of prefabricated belts.

FIG. 2 is a schematic representation of the belt track 110, measurement belt 120, and clamps 130, 140 of the tool 100 as the tool 100 is being used to identify a correct belt for a system of pulleys 210, 220, 230 from a plurality of prefabricated belts. The system of pulleys 210, 220, 230 may be any system of pulleys including but limited to a system of pulleys 210, 220, 230 which may be part of an automobile or other vehicle engine or part of construction equipment or industrial machinery. For example, the original belt used by the system of pulleys 210, 220, 230 may have become worn, needing to be replaced. The system of pulleys 210, 220, 230 may include a tensioner 220. The tensioner 220 may be an idler pulley that serves to increase the tension on the belt either by manual operation or automatically by being biased (e.g., spring bias) in a direction that increases tension. As shown, for example, the tensioner 220 may be movable in the direction of the arrow between an installed position shown by dashed lines and a tensioned position shown by solid lines. In the case of an automatic tensioner, the tensioner 220 may be biased in the direction of the arrow, e.g. by a spring. In the installation position, the tensioner 220 is moved out of the way so that the belt to be installed or the measurement belt of the tool can be wrapped around the pulleys (i.e., driven and drive pulleys) without the use of a tool. In the tensioned position, the belt to be installed or the measurement belt of the tool may be wrapped around the pulleys and the tensioner 220 places tension on the belt so that the belt remains on the pulleys.

The user of the tool 100 tightens the first end portion clamp 130 to fix the first end portion 122 of the measurement belt 120 at the first belt receiving end portion 112 of the belt track 110 with the measurement belt 120 positioned on a clamping surface of the belt track 110 (i.e. the upper surface of the belt track 110 in FIGS. 1 and 2). Alternatively, the first end portion 122 of the measurement belt 120 may be already fixed to the first belt receiving end portion 112, i.e. permanently. The user may then wrap the measurement belt 120 around the pulleys 310, 320, 330 according to the specifications of the pulley system, i.e. along the same path that the belt to be purchased as a replacement will traverse, and brings the second end portion of the measurement belt 120 back to the belt track 110 so that the second end portion 124 of the measurement belt 120 passes along the clamping (upper) surface of the belt track 110 at the second belt receiving end portion 114. The first end portion clamp 130 holds the first end portion 122 of the measurement belt 120 in place. The measurement belt 120 is disposed around the system of pulleys 310, 320, 330. The second end portion of the measurement belt may be attached to the second end portion of the belt track with the second end portion clamp 140.

The user may place tension on the belt by engaging the tensioner. If the tensioner bottoms out, then the user must disengage the second end portion clamp 140 and manually pull the second end portion of the measurement belt 120 through the belt track and the second end portion clamp 140 a bit more. This shortens a length of the measurement belt 120 between the first end portion clamp 130 and the second end portion clamp 140. The user then tests whether the tensioner can place a sufficient amount of tension on the measurement belt. This process is repeated until the tensioner 220 can place the proper amount of tension on the measurement belt. Once the tensioner 220 can place the proper amount of tension on the belt, the user can read the measurement marking 126 aligned to a reference indicator that indicates the correct belt to be ordered from among a plurality of prefabricated belts having different lengths. This is discussed further below.

As noted above, the user can read the measurement marking 126 that indicates the correct belt to be ordered from a plurality of prefabricated belts. For example, the correct belt for the system of pulleys can be identified by a measurement marking 126 of the plurality of measurement markings 126 that is aligned (e.g. immediately adjacent) to a reference indicator 160 on the tool 100. As shown in FIG. 2, the reference indicator 160 may be an interior edge of the second end portion clamp 140 (i.e. an edge of the second end portion clamp 140 that borders the space between the clamps 130, 140). More generally, the reference indicator 160 may be an edge of the second end portion clamp 140 or an edge of the belt track 110, or may be the extreme end of the first end portion 122 of the measurement belt 120 (i.e. the beginning of the measurement belt 120). The reference indicator 160 may also be a reference mark (e.g. paint, dye, etc.) on the belt track 110, on the second end portion clamp 140, or on the first end portion 122 of the measurement belt 120 (e.g. a zero position). The measurement markings on the second end portion of the measurement belt may each refer to one of a plurality of prefabricated belts. For example, a belt manufacturer may have a plurality of V-belts of various lengths. The various lengths may be 10 inches, 12 inches, 14 inches, 16 inches, etc. up to 40 inches. Each measurement marking of the plurality of measurement markings may correspond to one of the various lengths of predetermined belt lengths. Other codes for the various belt lengths from a manufacturer may be used by the manufacturer. However, each of the measurement markings on the second end portion of the measurement belt may correspond to the manufacturer's codes for the various belt lengths that it manufactures.

In a case where the first end portion 122 of the measurement belt 120 is not permanently fixed with respect to the belt track 110, the first end portion 122 of the measurement belt 120 must be aligned to the belt track 110 properly so that the measurement markings on the second end portion of the measurement belt correctly correspond to specific predetermined belt lengths or belt sizes of a manufacturer It is important for the first end portion 122 of the measurement belt 120 to be clamped to the belt track 110 at the same place so that the reference indicator points to the right measurement marking to indicate the correct belt of the manufacturer. To this end, the extreme end of the first end portion 122 of the measurement belt 120 may begin at a designated positon 170 on the belt track 110 such as the position corresponding to the interior edge of the first end portion clamp 130 as shown (i.e. the edge of the first end portion clamp 130 that borders the space between the clamps 130, 140). After looping the measurement belt 120 around the pulleys 210, 220, 230 and back above the belt track 110 at the second end portion 114, the user may then adjust the second end portion 124 of the measurement belt 120 so that it 124 crosses the reference indicator 160 as shown. The measurement marking which is aligned to the reference indicator 160 may indicate the correct belt from a plurality of prefabricated belts. When the user of the tool 100 reads the value of the measurement marking 126 that is nearest or aligned to the reference indicator 160, (e.g. 72 inches), that measurement marking will correctly correspond to the correct belt that should be ordered for the pulley system from the plurality of prefabricated belts.

Figure 3:
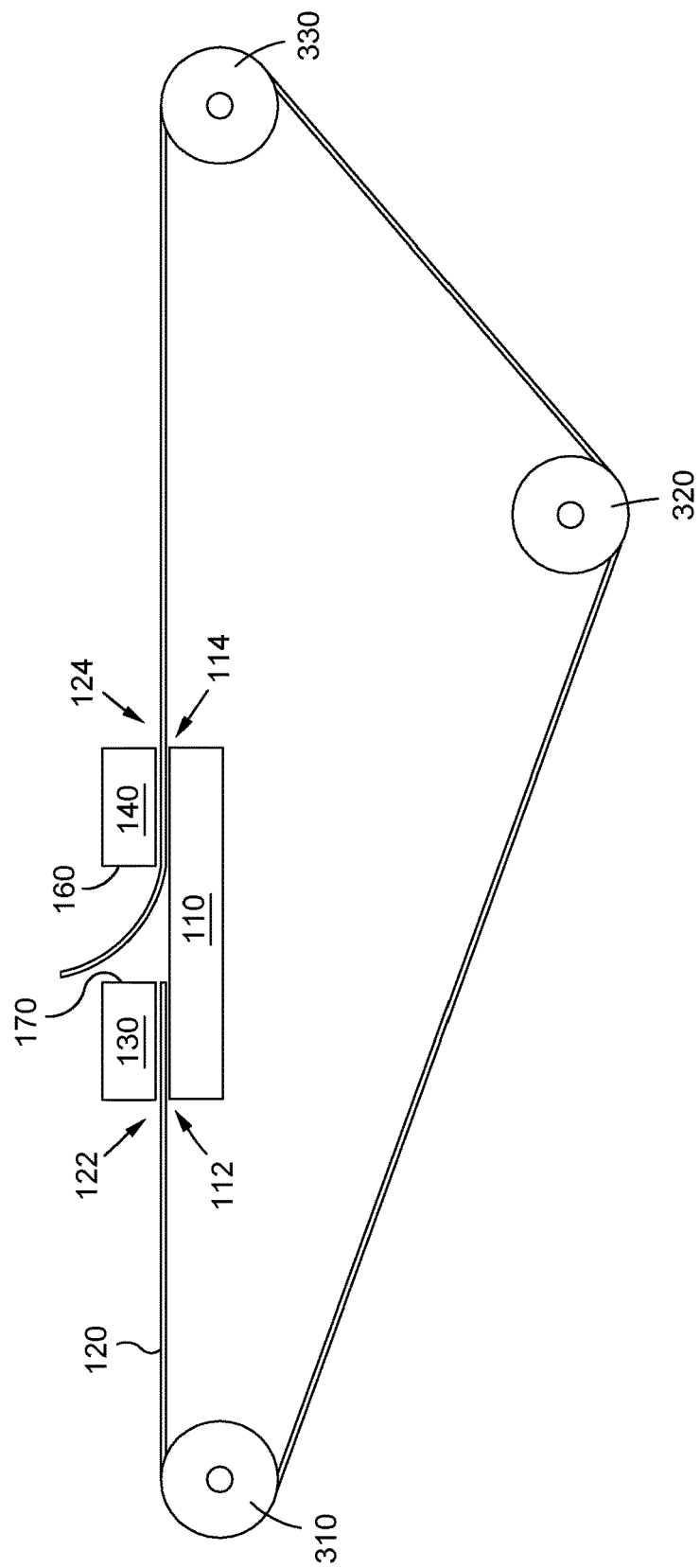
FIG. 3 is a schematic representation of the belt track, the measurement belt, the first end portion clamp, and the second end portion clamp of the tool as the tool is being used to identify a correct belt for another system of pulleys from a plurality of prefabricated belts.

FIG. 3 is a schematic representation of the belt track 110, measurement belt 120, and clamps 130, 140 of the tool 100 as the tool 100 is being used to determine a correct belt for another system of pulleys 310, 320, 330 from a plurality of prefabricated belts. FIG. 3 differs from FIG. 2 in that the system of pulleys 310, 320, 300 doesn't include a tensioner 220. In the example of FIG. 3, the user of the tool 100 may achieve the correct tension for the system of pulleys 310, 320, 330 by pulling the measurement belt 120, e.g. through the space between the clamps 130, 140. Once the proper tension is achieved in the measurement belt 120, the user may read the measurement marking aligned to the reference indicator to determine the correct belt from among the plurality of prefabricated belts.

Figure 4A:
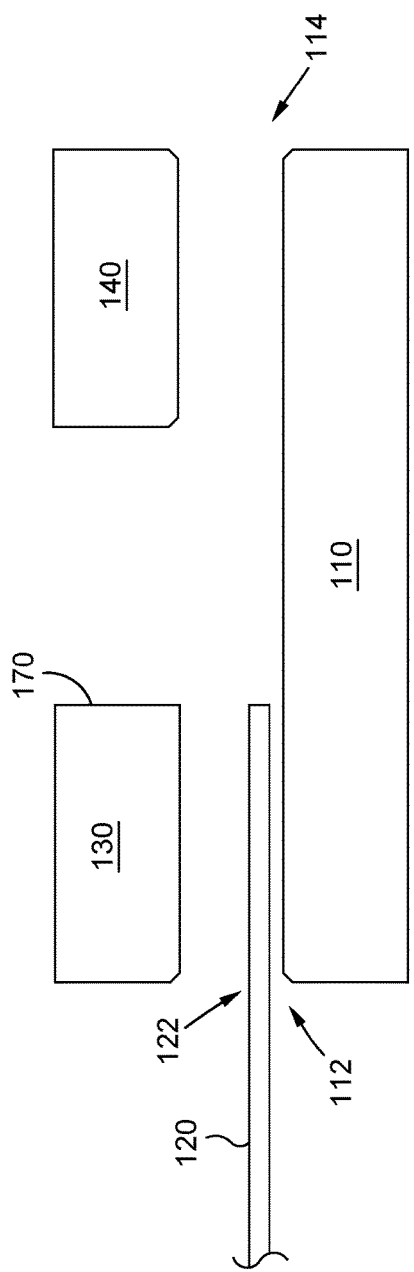
FIG. 4A is a schematic representation of a first part of a belt selection procedure.

FIGS. 4A-4D are a schematic representation of a clamping procedure of the tool 100. First, in FIG. 4A, the first end portion 122 of the measurement belt 120 is positioned on the clamping surface of the belt track 110 at the designated position 170. As noted above the designated position 170 may be marked with a line or other visible marking (not shown) on the belt track 110 or may simply be the interior edge of the first end portion clamp 130 as shown. To further improve the usability of the tool 100, the designated position 170 may further include a tactile feature, such as a notch or wall in the belt track 110 that the measurement belt 120 can easily be pushed up against to properly align the first end portion of the measurement belt to the belt track. Then, in FIG. 4B, the first end portion clamp 130 clamps the first end portion 122 of the measurement belt 120 at the first belt receiving end portion 112. After disposing the measurement belt 120 around the system of pulleys, the second end portion 124 of the measurement belt 120 is passed along the clamping surface of the belt track 110, as shown in FIG. 4C. As shown in FIG. 4C, the measurement belt 120 may be pulled through a gap between the belt track 110 and the second end portion clamp 140. Lastly, as shown in FIG. 4D, the second end portion clamp 140 attaches the second end portion 124 of the measurement belt 120 to the belt track 110 at the second belt receiving end portion 114. As described above, the correct belt for the system of pulleys may be identified through a trial and error procedure with the tool. More particularly, a length of the measurement belt around the system of pulleys is adjusted. The tensioner is adjusted to apply pressure to the measurement belt to determine if a sufficient amount of tension on the measurement belt can be achieved. Once this is achieved, the measurement marking that is aligned to the reference indicator is read. That measurement marking indicates the correct belt from the plurality of prefabricated belts.

In the example of FIGS. 4A-4D, the tool 100 includes a reference indicator 160 (see FIG. 4D), namely the inner edge of the second end portion clamp 140. When the user pulls the measurement belt 120 up through the space between the clamps 130, 140 (see FIG. 4D), the part of the measurement belt 120 that crosses the reference indicator 160 can easily be observed through the space between the clamps 130, 140 (or from the side). The measurement marking 126 that is immediately adjacent to or aligned to the reference indicator 160 informs the user the correct belt to choose from a plurality of prefabricated belts for the system of pulleys.

Figure 4B:
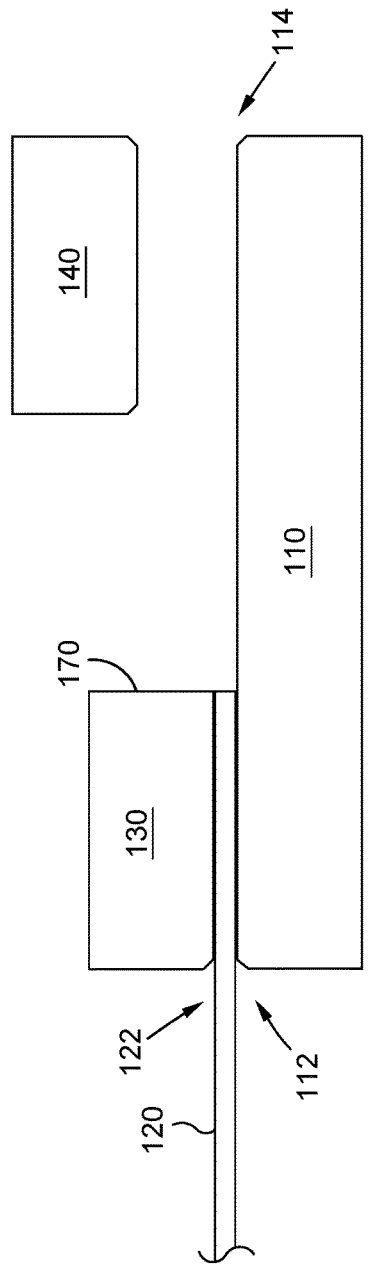
FIG. 4B is a schematic representation of a second part of a belt selection procedure.

Also shown in FIGS. 4A-4C are chamfered edges of the belt track 110 and the clamps 130, 140. Sliding the measurement belt 120 between the clamp 140 may cause the measurement belt 120 to dig into the edges 131, 132 and make adjusting the measurement belt 120 between the second end portion clam and belt track more difficult. By forming chamfers or bevels or placing rollers at these places, the tool 100 may be used more easily and with less force to adjust the length of the measurement belt. For example, the inner edge 131 of the second end portion clamp 140 (i.e. the edge that borders the space between the clamps 130, 140) may include a chamfer, bevel, or roller to ease the stress between the second end portion clamp 140 and the measurement belt 120 as the measurement belt 120 is pulled up through the space. As another example, the edge 132 of the second belt receiving end portion 114 of the belt track 110 (i.e. the edge of the belt track 110 that contacts the second end portion 124 of the measurement belt 120 as the second end portion clamp 140 attaches the second end portion 124 of the measurement belt 120 to the belt track 110) may include a chamfer, bevel, or roller to ease a reaction stress between the belt track 110 and the measurement belt 120 as the measurement belt 120 is pulled up through the space. In some embodiments of the second end portion clamp 140, a chamfer, bevel, roller, or other feature may also make it easier to thread the measurement belt 120 between the belt track 110 and the clamp 130, 140 when the second clamp 140 is in the disengaged state.

Figure 5:
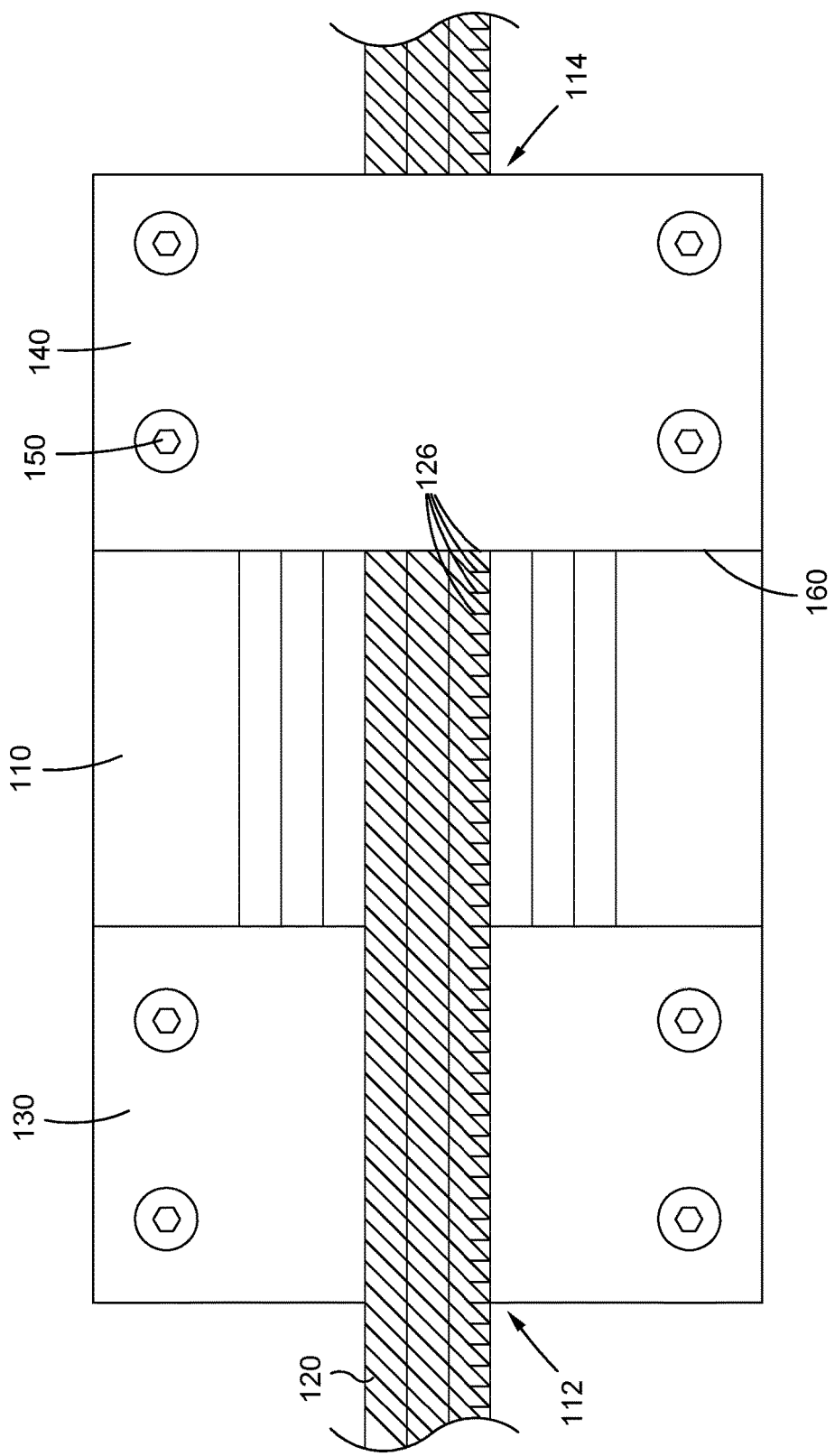
FIG. 5 is a schematic top view of the belt track of the tool with the measurement belt clamped at the first end portion and the second end portion by the first end portion clamp and the second end portion clamp.

FIG. 5 is a schematic top view of the belt track 110 of the tool 100 with the measurement belt 120 clamped at the first end portion 122 and the second end portion 124 by the first end portion clamp 130 and the second end portion clamp 140. FIG. 5 represents an overhead perspective of the state shown in FIG. 4D, with the slack of the free end of the measurement belt 120 having been pulled up through the space between the clamps 130, 140 and over the first end portion clamp 130. As shown in FIG. 5, the second end portion 124 of the measurement belt 120 is marked with measurement markings 126 along its length. With the second end portion clamp 140 attaching the second end portion 124 of the measurement belt 120 to the belt track 110, the user may test whether sufficient tension may be applied to the measurement belt with the tensioner and if so, the user may read which measurement marking 126 is aligned to (i.e., at or nearest to) the reference indicator 160, which in this example is the interior edge of the second end portion clamp 140. The nearest measurement marking 126 may be the nearest visible measurement marking 126 (the next longest belt) or may be the true nearest measurement marking 126 (an unseen measurement marking 126 covered by the second end portion clamp 140 but understood to be the nearest by the user).

Figure 6A:
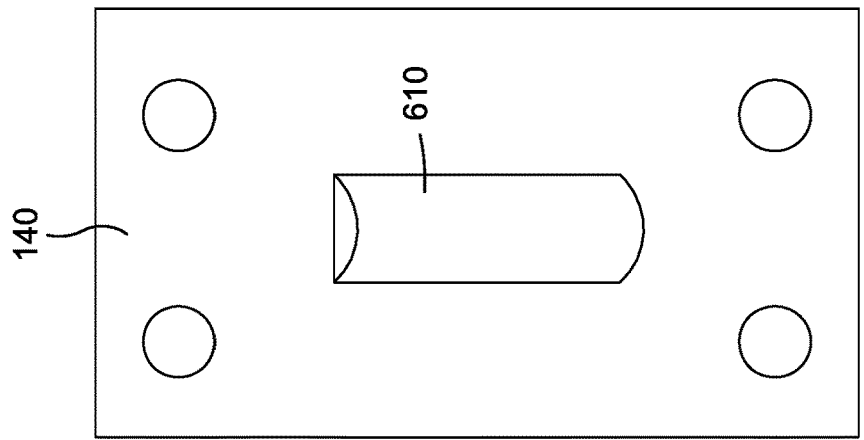
FIG. 6A is a schematic bottom view of an exemplary embodiment of the second end portion clamp of the tool.

FIG. 6A is a schematic bottom view of an exemplary embodiment of the second end portion clamp 140 of the tool 100. In the example shown in FIG. 6A, the second end portion clamp 140 is provided with a one-way directional roller 610 on the underside thereof. The one-way directional roller 610 may be configured to roll in only one direction and not the other by any known means, such as by connection to a ratchet (not shown).

Figure 6B:
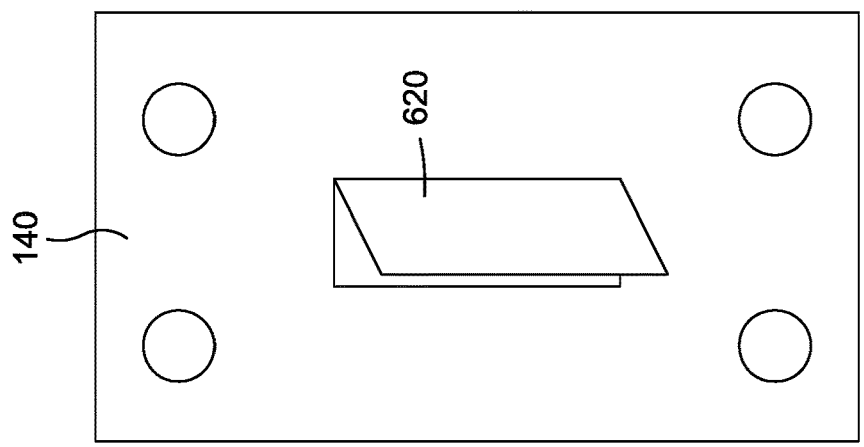
FIG. 6B is a schematic bottom view of another exemplary embodiment of the second end portion clamp of the tool.

FIG. 6B is a schematic bottom view of another exemplary embodiment of the second end portion clamp 140. In the example shown in FIG. 6B, the second end portion clamp 140 is provided with a one-directional gate 620. The one-directional gate 620 may be configured, by any known means, to open and allow passage in one direction while remaining closed and hindering passage in the opposite direction. In the example of FIG. 6B, the one-directional gate 620 may include a hinged surface biased in an open direction, e.g. by a spring (not shown).

Figure 6C:
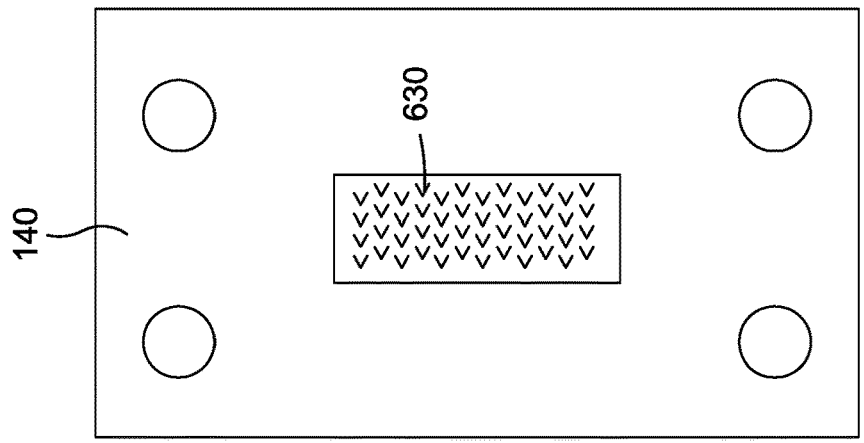
FIG. 6C is a schematic bottom view of another exemplary embodiment of the second end portion clamp of the tool.

FIG. 6C is a schematic bottom view of another exemplary embodiment of the second end portion clamp 140. In the example shown in FIG. 6C, the second end portion clamp 140 may be provided with a one-way directional friction coating 630. The one-way directional friction coating 630 may be configured, by any known means, to hinder passage in one direction and not the other. For example, the one-way directional friction coating 630 may include small directed protrusions, e.g. scales, as might be found on a rasp or file. The one-way directional friction coating 630 may have a coarseness that hinders passage of the material of the measurement belt 120 without damaging it.

When a second end portion clamp 140 having the one-way directional roller 610, gate 620, or friction coating 630 of FIGS. 6A-6C clamps the second end portion 124 of the measurement belt 120 to the belt track 110 at the second belt receiving end portion 114, the one-way directional roller 610, gate 620, or friction coating 630 may allow movement of the measurement belt 120 in one direction and not the other. For example, the second end portion clamp 140 may be clamped loosely enough to allow rolling by the one-way directional roller 610, slight movement against bias of the hinged surface of the one-directional gate 620 to open a passage, or sliding with a grain of the friction coating 630. In this way, the second end portion clamp 140 may include a one-way directional roller 610, gate 620, or friction coating 630 that allows an increase but not a decrease in tension of the measurement belt 120 while the second end portion 124 of the measurement belt 120 is attached to the belt track 110 by the second end portion clamp 140. This may result in increased usability of the tool 100 as the user may not need to worry about achieving the correct tension prior to the clamping of the measurement belt 120 by the second end portion clamp 140, which may entail some difficulty as the user pulls the measurement belt 120 to increase tension with one hand while engaging the second end portion clamp 140 with the other. By disposing a one-way directional roller 610, gate 620, or friction coating 630, the tool may instead be designed to allow a relatively loose clamping of the second end portion clamp 140 prior to tightening to achieve the correct tension. The correct tension can thus be achieved more easily, especially when one hand of the user is needed elsewhere, such as to traverse a tensioner of the pulley system (e.g. tensioner 220 of FIG. 2) to an installed position.

Figure 7:
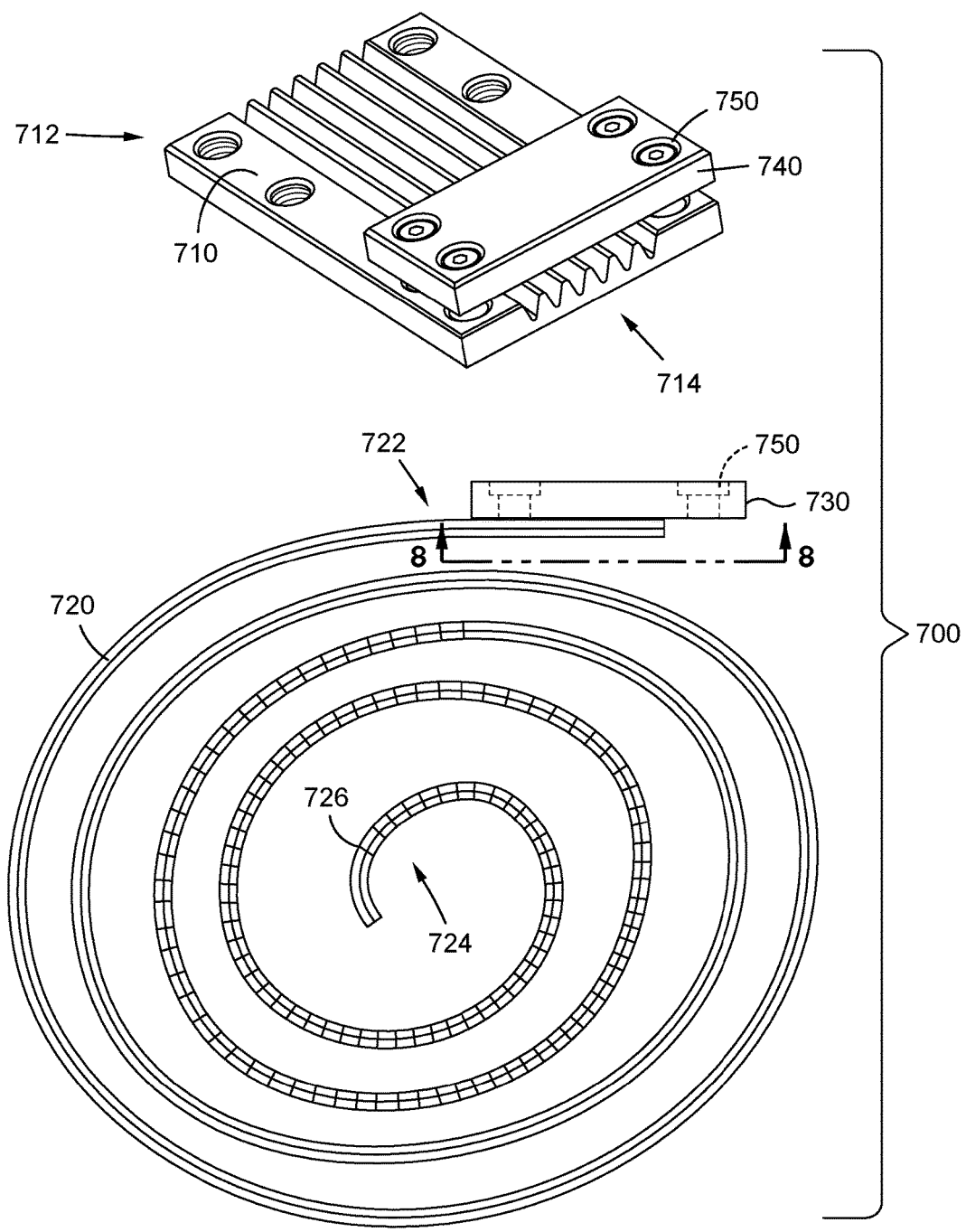
FIG. 7 is a perspective view of another tool for identifying a correct belt for a system of pulleys from among a plurality of prefabricated belts having different lengths.

FIG. 7 is a perspective view of another tool 700 for identifying a correct belt to be ordered for a system of pulleys from among a plurality of prefabricated belts. Similar to the belt track 110, measurement belt 120, first end portion clamp 130, and second end portion clamp 140 of the tool 100 shown in FIG. 1, the tool 700 may include a belt track 710 having a first belt receiving end 712 and a second belt receiving end 714 and a measurement belt 720 having a first end portion 722 and a second end portion 724, along with a first end portion clamp 730 and a second end portion clamp 740. However, unlike the first end portion clamp 130 of the tool 100 shown in FIG. 1, the first end portion clamp 730 of the tool 700 may be directly attached to the measurement belt 720. Thus, when using the first end portion clamp 730 to clamp the first end portion 722 of the measurement belt 720 to the belt track 710 at the first belt receiving end 712, there is no need for the user of the tool 700 to position the measurement belt 720. The position is already determined by the attachment position of the measurement belt 720 to the first end portion clamp 730 and the position at which the first end portion clamp 730 engages with the belt track 710 (e.g. by means of screws or bolts 750 as shown or by any other fastener). The measurement belt 720 can then be wrapped around the system of pulleys for which a correct belt length is to be identified and attached to the second belt receiving end 714 of the belt track 710 with the second end portion clamp 740. A measurement marking 726 may be read in the same way as described above with respect to the tool 100. Because the position of the measurement belt 720 with respect to the belt track 710 is fixed upon the engagement of the first end portion clamp 730 with the belt track 710, the optional visual or tactile features of the designated position 170 described with respect to FIGS. 4A-4D are unnecessary. The measurement markings 726 of the tool 700 may be arranged according to a known relationship between the fixed beginning end of the measurement belt 720 and a reference indicator 160 as described above.

Figure 8:
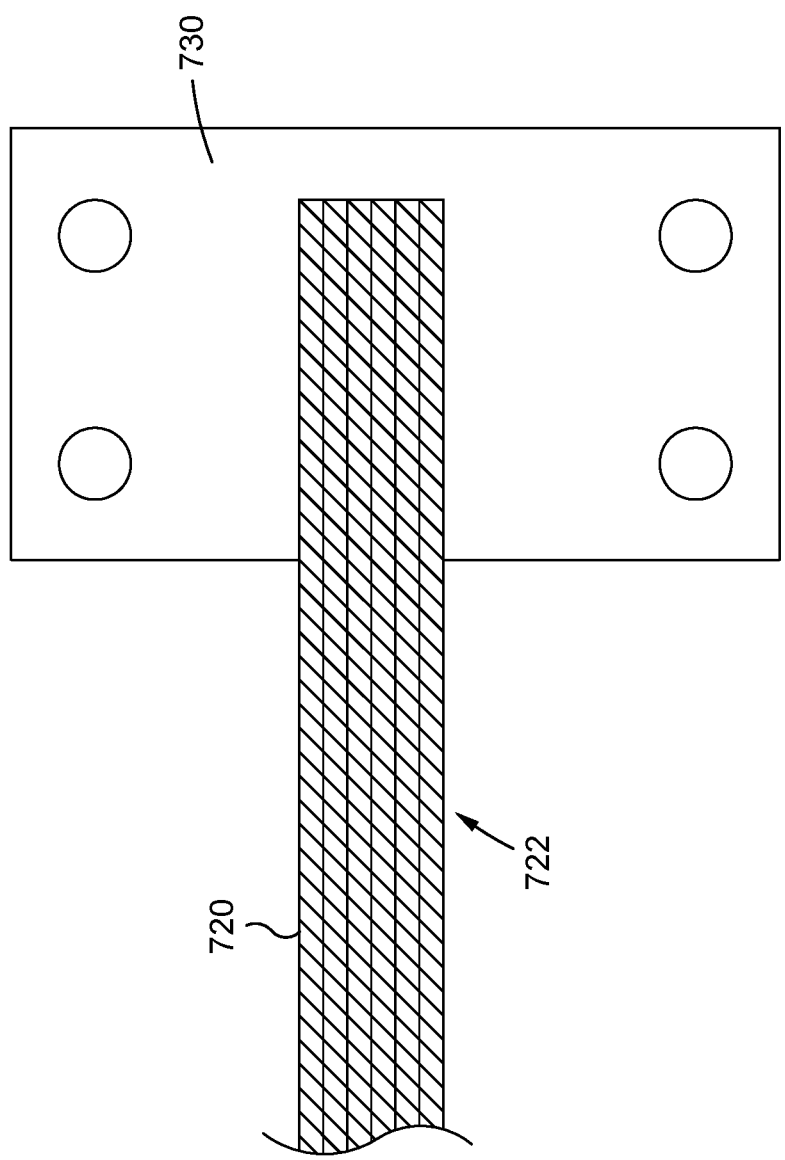
FIG. 8 is a schematic bottom view of a first end portion clamp of the tool and an attached measurement belt.

FIG. 8 is a schematic bottom view of the first end portion clamp 730 of the tool 700 and the attached first end portion 722 of the measurement belt 720. The first end portion clamp 730 may be attached to the measurement belt 720 by any known attachment mechanism, including bonding (e.g. ultrasonic bonding), an adhesive (e.g. glue), one or more fasteners (e.g. bolts), etc. The attachment of the first clamp 730 to the measurement belt 720 may be of a permanent nature. For example, the first clamp 730 may be permanently attached to the measurement belt 720 by the manufacturer or by a user.

Figure 9:
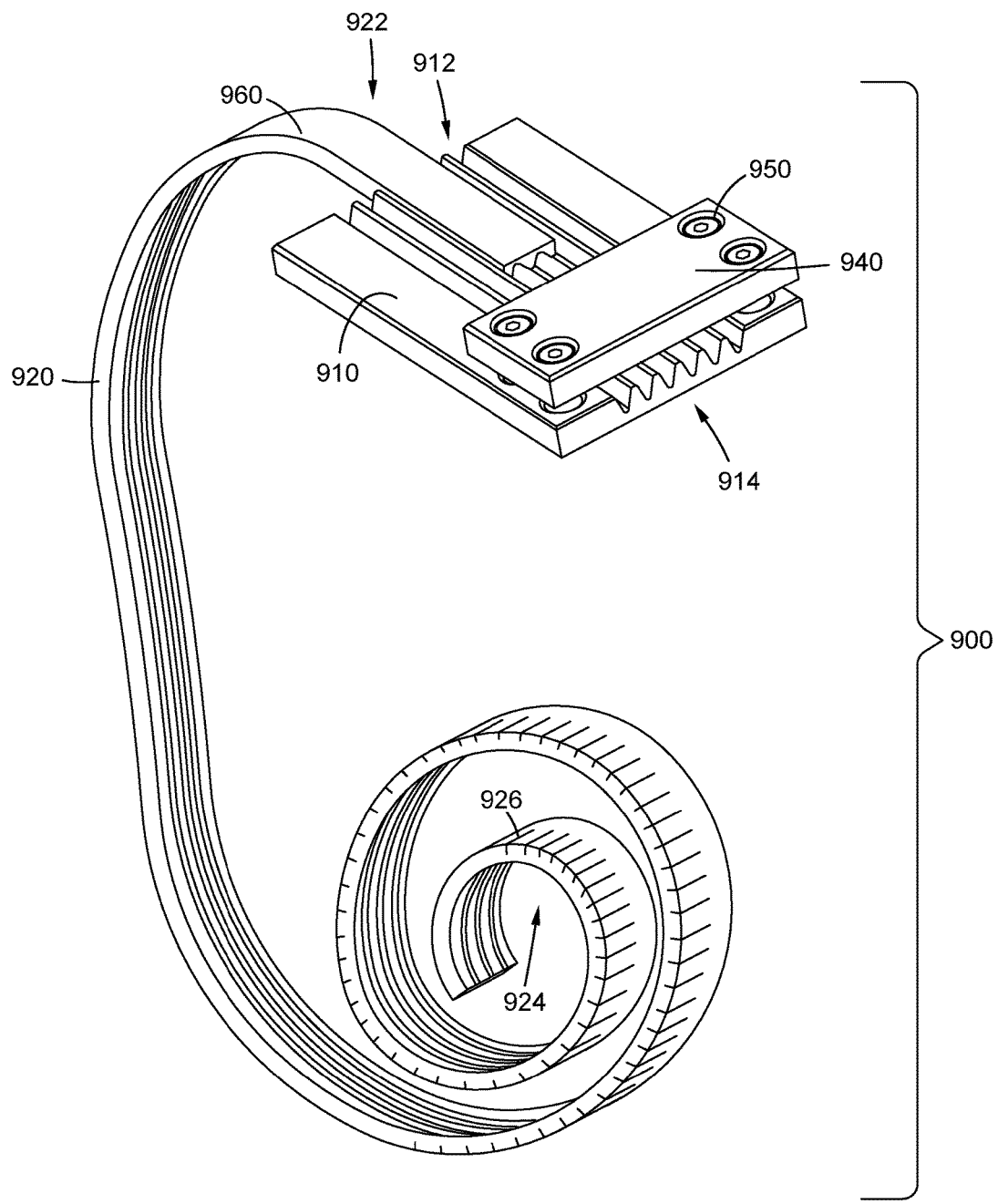
FIG. 9 is a perspective view of another tool for identifying a correct belt for a system of pulleys from among a plurality of prefabricated belts having different lengths.

FIG. 9 is a perspective view of another tool 900 for identifying a correct belt le to be ordered for a system of pulleys from among a plurality of prefabricated belts. Similar to the belt track 110, measurement belt 120, and second end portion clamp 140 of the tool 100 shown in FIG. 1, the tool 900 may include a belt track 910 having first and second belt receiving ends 912, 914, a measurement belt 920 having first and second end portions 922, 924, and a second end portion clamp 940. However, unlike the measurement belt 120 of the tool 100 shown in FIG. 1, the measurement belt 920 of the tool 900 is permanently attached to the belt track 910. Thus, there is no need to clamp the first end portion 922 of the measurement belt 920 to the first belt receiving end 912 of the belt track 910, and the first end portion clamp 130 of the tool 100 can be omitted. There is also no need to position the measurement belt 920 at the first belt receiving end 912 of the belt track 910 since the position is already determined by the attachment position of the measurement belt 920 to the belt track 910. The measurement belt 920 can then be wrapped around the system of pulleys for which a correct belt is to be identified and attached to the second belt receiving end 914 of the belt track 910 with the second end portion clamp 940 (e.g. by means of screws or bolts 950 as shown or by any other fastener). A measurement marking 926 may be read in the same way as described above with respect to the tool 100. Because the position of the measurement belt 920 with respect to the belt track 910 is fixed by the attachment of the measurement belt 920 to the belt track 910, the optional visual or tactile features of the designated position 170 described with respect to FIGS. 4A-4D are unnecessary. The measurement markings 926 of the tool 900 may be arranged according to a known relationship between the fixed beginning end of the measurement belt 920 and a reference indicator 160 as described above.

Figure 10:
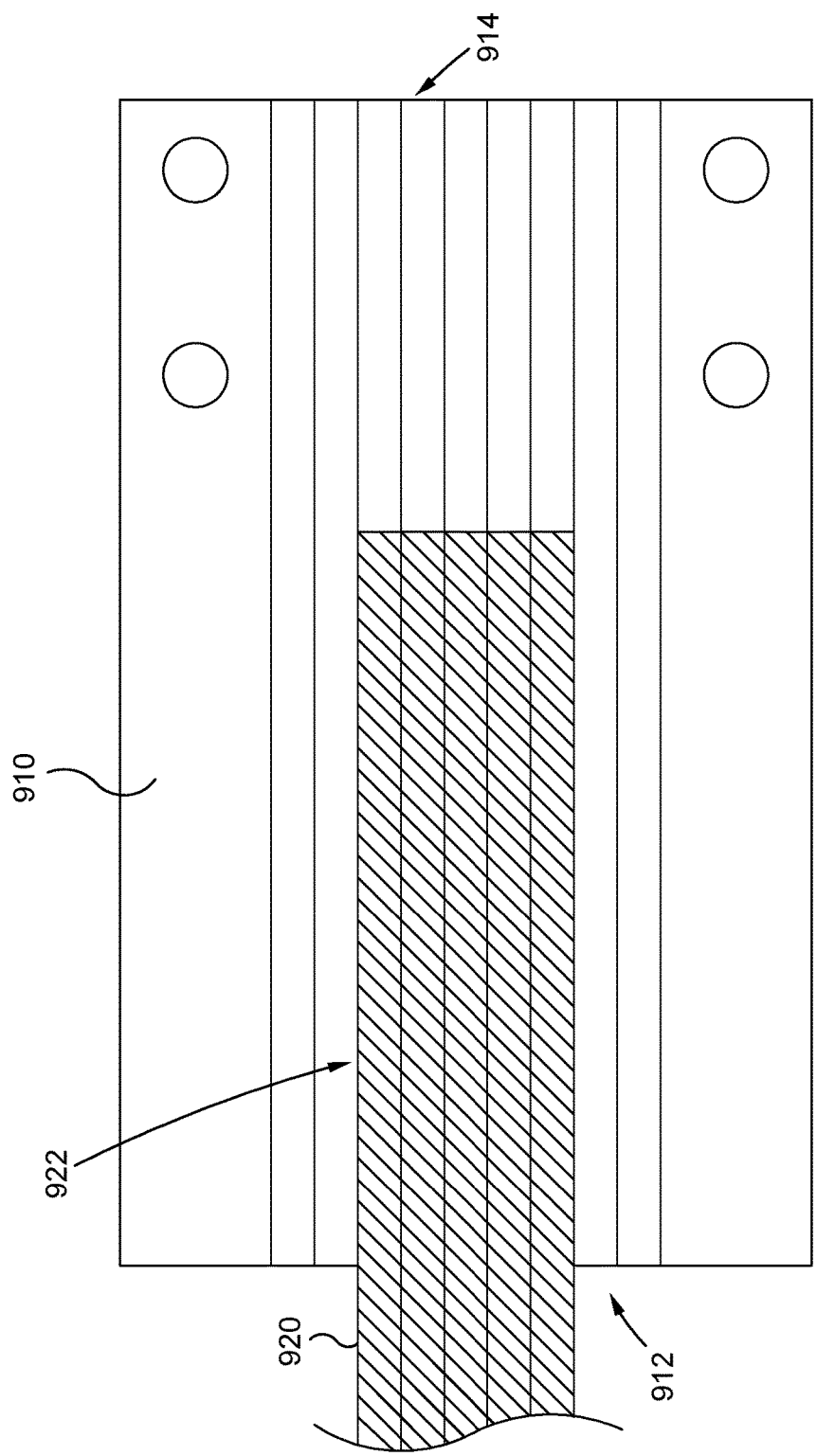
FIG. 10 is a schematic top view of a belt track of the tool and an attached measurement belt.

FIG. 10 is a schematic top view of the belt track 910 of the tool 900 and the attached first end portion 922 of the measurement belt 920. The measurement belt 920 may be attached to the belt track 910 by any known attachment mechanism, including bonding (e.g. ultrasonic bonding), an adhesive (e.g. glue), one or more fasteners (e.g. bolts), etc. The attachment of the measurement belt 920 may be of a permanent nature. For example, the measurement belt 920 may be permanently attached to the belt track 910 by the manufacturer or by a user. As shown in FIG. 10, the belt track 910 may omit some of the receiving holes for screws or bolts 950 (or other features in the case of other types of fasteners) since there is only a second end portion clamp 940 and no first end portion clamp 130 as in the tool 100 of FIG. 1.

Figure 11:
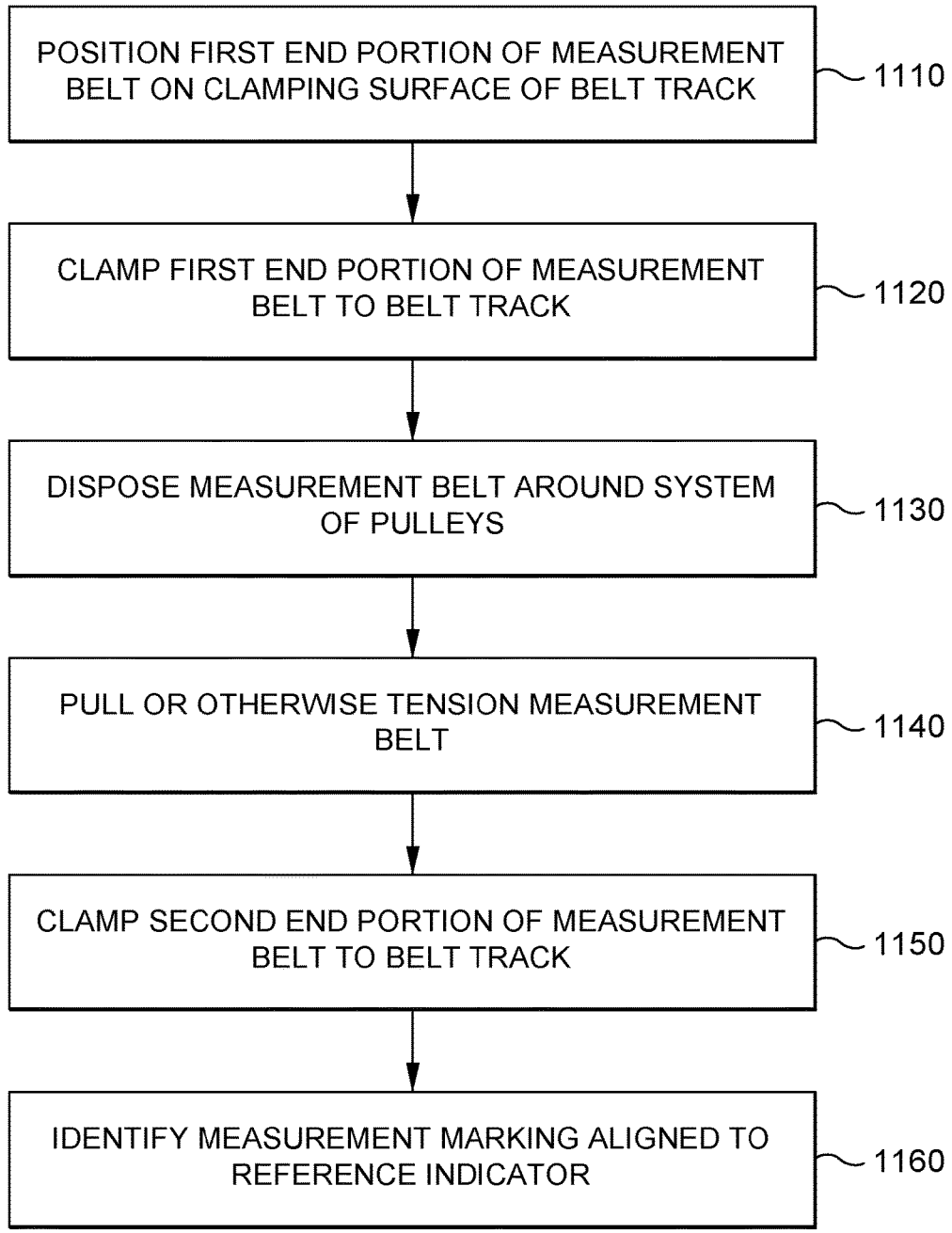
FIG. 11 is an example operational flow that may be followed by a user of a tool for identifying a correct belt length for a system of pulleys.

FIG. 11 is an example operational flow that may be followed by a user of the tool 100, 700, or 900. First, the user may position the first end portion 122 of the measurement belt 120 on the clamping (e.g. upper) surface of the belt track 110 (S1110). In the case of the tools 700 and 900, this step may be omitted because the positions of the first end portions 722, 724 of the measurements belts 720 and 920 are fixed as described above. Positioning the measurement belt 120 of the tool 100 may include simply placing the first end portion of the measurement belt 120 on the belt track 110 and aligning the first end portion to the designated position 170 on the belt track 110 as described above. Positioning the measurement belt 120 may further include using any of a number of pre-clamping mechanisms (not shown) to removably attach the first end portion 122 of the measurement belt 120 to the belt track 110 or to the first end portion clamp 130 so that it does not move prior to the clamping of the first end portion clamp 130. Such pre-clamping mechanism might include a clip, a hook-and-loop fastening surface such as Velcro, a friction surface, or any other fastening feature. Such pre-clamping mechanisms may be on the belt track 110 or the measurement belt 120, or may be on the first end portion clamp 130 (e.g. the measurement belt 120 is removably attached to the lower surface of the first end portion clamp 130 as the measurement belt 120 is positioned on the belt track 110).

With the measurement belt 120 having been positioned in step S1110 (or with the measurement belt 720 or 920 already positioned with step S1110 omitted), the user may then use the first end portion clamp 130, 730 to attach the first end portion 122, 722 of the measurement belt 120, 720 to the belt track 110, 710 (S1120). In the case of the tool 900, this step may be omitted because the first end portion 922 of the measurement belt 920 is fixedly attached to the belt track 910 as described above.

With the measurement belt 120, 720 held in place by the first end portion clamp 130, 730 per step S1120 (or with the measurement belt 920 held in place by its attachment to the belt track 910 and step S1120 omitted), the user then disposes the measurement belt 120, 720, 920 around the system of pulleys for which a correct belt is to be identified from among a plurality of prefabricated belts. The second end portion of the measurement belt may be routed back to the clamping surface of the belt track 110, 710, 910 (S1130).

Lastly, the user adjusts the length of the measurement belt and secures the second end portion of the measurement belt to the belt track such as by using the second end portion clamp. The user may then test tension or test whether a sufficient amount of tension can be applied to the measurement belt by using a tensioner of the pulley system. The correct belt for the system of pulleys from among a plurality of prefabricated belts may then be identified by a measurement marking 126, 726, 926 that is aligned to a reference indicator 160 of the tool 100, 700, 900. As described above, the tensioning of the measurement belt 120, 720, 920 in step S1140 may precede or follow the clamping of the measurement belt 120, 720, 920 with the second end portion clamp 140, 740, 940, or may partially precede and partially follow the clamping of the measurement belt 120, 720, 920 with the second clamp 140, 740, 940, depending on the design of the second clamp 140, 740, 940 (e.g. whether it includes a one-way directional roller 610, gate 620, or friction coating 630) and the design of the pulley system (e.g. whether it includes a tensioner 220). Steps 1140 and 1150 may be repeated, alternating between tensioning and clamping as necessary until the correct tension in the measurement belt for the system of pulleys is achieved.

By using the tool 100, 700, 900 to read a nearest measurement marking 126, 726, 926 of a measurement belt 120, 720, 920 to a reference indicator 160, a person can conveniently identify the correct belt for a system of pulleys and choose from among a plurality of prefabricated belts without having to purchase a number of different sized belts from the manufacturer and testing each one by trial and error to see if one of them fits. In this way, the various aspects described herein can help a person avoid wasting time, money, and resources when replacing belts in vehicle engines, construction equipment, or industrial machinery.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A tool for identifying a correct belt for a system of pulleys from among a plurality of prefabricated belts having different lengths, the tool comprising:
    a belt track;
    a measurement belt configured to engage with the system of pulleys and having a first end portion attached to the belt track and a second end portion, the measurement belt having a plurality of measurement markings at premeasured positions along its length at the second end portion, the plurality of measurement markings corresponding to the plurality of prefabricated belts;
    a second end portion clamp adapted to attach the second end portion of the measurement belt to the belt track with the measurement belt disposed around the system of pulleys to test whether a tensioner of the system of pulleys is capable of placing sufficient tension on the measurement belt,
    wherein a measurement marking of the plurality of measurement markings that is aligned to a reference indicator on the tool identifies the correct belt to order for the system of pulleys from the plurality of prefabricated belts.

2. The tool of claim 1, wherein
    the first end portion of the measurement belt is removable from the belt track; and
    the tool further comprises a first end portion clamp adapted to attach the first end portion of the measurement belt to the belt track.

3. The tool of claim 1, wherein the belt track is marked at a designated position for positioning the first end portion of the measurement belt on the belt track.

4. The tool of claim 2, wherein
    the first end portion clamp is formed as a plate and is disposed substantially parallel with a clamping surface of the belt track that presses the first end portion of the measurement belt against the belt track,
    the second end portion clamp is formed as a plate and is disposed substantially parallel with the clamping surface of the belt track that presses the second end portion of the measurement belt against the belt track, and
    the first and second clamps are separated on the clamping surface by a space through which the measurement belt is pulled to adjust the measurement belt.

5. The tool of claim 4, wherein an interior edge of the second end portion clamp that borders the space and contacts the measurement belt includes a chamfer, bevel, or roller to reduce a coefficient of friction and facilitate traversal of the measurement belt between the second end portion clamp and the belt track.

6. The tool of claim 1, wherein the second end portion clamp is formed as a plate and is disposed substantially parallel with a surface of the belt track that presses the second end portion of the measurement belt against the belt track.

7. The tool of claim 6, wherein the second end portion clamp is transitionable between a locked position in which the second end portion clamp presses the second end portion of the measurement belt against the belt track to attach the second end portion of the measurement belt to the belt track and an unlocked position in which the second end portion clamp moves away from the belt track to allow the second end portion of the measurement belt to slide between the second end portion clamp and the belt track.

8. The tool of claim 6, wherein
the first end portion of the measurement belt and the second clamp are separated on the clamping surface by a space through which the measurement belt is pulled to tension the measurement belt, and
an interior edge of the second end portion clamp that borders the space includes a chamfer, bevel, or roller.

9. The tool of claim 1, wherein the second end portion clamp and/or a clamping surface of the belt track includes a one-directional roller, gate, or friction coating that allows a length of the measurement belt from the first end portion clamp to the second end portion clamp to be reduced but not increased when in a locked position.

10. The tool of claim 1, wherein
the measurement belt includes grooves or protrusions, and
the belt track includes grooves or protrusions corresponding to the grooves or protrusions of the measurement belt.

11. The tool of claim 1, wherein an exterior edge of the belt track that contacts the second end portion of the measurement belt as the second end portion clamp attaches the second end portion of the measurement belt to the belt track includes a chamfer, bevel, or roller.

12. The tool of claim 1, wherein the reference indicator is a reference mark on the belt track, on the second end portion clamp, or on the first end portion of the measurement belt.

13. The tool of claim 1, wherein the reference indicator is an edge of the belt track, an edge of the second end portion clamp, or an extreme end of the first end portion of the measurement belt.

14. The tool of claim 1, wherein
the first end portion of the measurement belt is permanently attached to the belt track.

15. A tool for identifying a correct belt for a system of pulleys from among a plurality of prefabricated belt having different lengths, the tool comprising:
a measurement belt having a v-shaped or trapezoidal cross section for engaging with the system of pulleys and having a first end portion and a second end portion, the measurement belt having a plurality of measurement markings at premeasured positions along its length at the second end portion, the plurality of measurement markings corresponding to the plurality of prefabricated belts,
wherein a measurement marking of the plurality of measurement markings that is aligned to a reference indicator on the tool identifies the correct belt for the system of pulleys from the plurality of prefabricated belts.

16. A method for identifying a correct belt for a system of pulleys from among a plurality of prefabricated belts having different lengths, the method comprising:
disposing a measurement belt around the system of pulleys with a first end portion of the measurement belt attached to a belt track, the measurement belt having a plurality of measurement markings at premeasured positions along its length at a second end portion of the measurement belt, the plurality of measurement markings corresponding to the plurality of prefabricated belts; and
disposing the second end portion of the measurement belt adjacent to the belt track,
wherein the correct belt for the system of pulleys from the plurality of prefabricated belts is identified by a measurement marking of the plurality of measurement markings that is aligned to a reference indicator on the belt track, on the second end portion clamp, or on the first end portion of the measurement belt.

17. The method of claim 16, further comprising
attaching the second end portion of the measurement belt to the belt track with a second end portion clamp.

18. The method of claim 17, further comprising
tensioning the measurement belt with a tensioner of the system of pulleys while the second end portion of the measurement belt is attached to the belt track with the second end portion clamp.

19. The method of claim 18, further comprising:
disengaging the second end portion clamp from the belt track;
shortening a length of the measurement belt while the second end portion clamp is disengaged from the belt track; and
engaging the second end portion clamp to reattach the second end portion of the measurement belt to the belt track;
tensioning the measurement belt with a tensioner of the system of pulleys while the second end portion of the measurement belt is attached to the belt track with the second end portion clamp.

* * * * *